(12) United States Patent
Utsumi

(10) Patent No.: US 11,360,787 B2
(45) Date of Patent: Jun. 14, 2022

(54) INFORMATION PROCESSING SYSTEM AND CONTROL METHOD

(71) Applicant: CANON KABUSHIKI KAISHA, Tokyo (JP)

(72) Inventor: Keiko Utsumi, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 243 days.

(21) Appl. No.: 16/714,462

(22) Filed: Dec. 13, 2019

(65) Prior Publication Data

US 2020/0201656 A1  Jun. 25, 2020

(30) Foreign Application Priority Data

Dec. 19, 2018 (JP) .............................. JP2018-237318

(51) Int. Cl.
*G06F 9/24* (2006.01)
*G06F 9/445* (2018.01)
*G06F 8/71* (2018.01)
*G06F 9/451* (2018.01)
*G06F 9/4401* (2018.01)

(52) U.S. Cl.
CPC ............ *G06F 9/44505* (2013.01); *G06F 8/71* (2013.01); *G06F 9/44536* (2013.01); *G06F 9/451* (2018.02); *G06F 9/4401* (2013.01)

(58) Field of Classification Search
CPC ........ G06F 9/44505; G06F 9/451; G06F 8/71; G06F 9/44536
USPC .......................................................... 713/1
See application file for complete search history.

(56) References Cited

U.S. PATENT DOCUMENTS

| 9,015,694 | B2* | 4/2015 | Gray | G06F 8/654 |
| | | | | 717/170 |
| 2003/0131083 | A1* | 7/2003 | Inui | G06F 8/65 |
| | | | | 709/221 |
| 2004/0243993 | A1* | 12/2004 | Okonnen | G06F 8/65 |
| | | | | 717/168 |
| 2009/0187900 | A1* | 7/2009 | Nakamoto | G06F 8/65 |
| | | | | 717/168 |
| 2011/0016400 | A1* | 1/2011 | Sakai | G06F 8/65 |
| | | | | 715/735 |
| 2011/0099544 | A1* | 4/2011 | Haramiishi | G06F 8/654 |
| | | | | 717/168 |

(Continued)

FOREIGN PATENT DOCUMENTS

JP  2017-191512 A  10/2017

*Primary Examiner* — Volvick Derose
(74) *Attorney, Agent, or Firm* — Canon U.S.A., Inc. IP Division

(57) ABSTRACT

An information processing system including a device and a client terminal which is able to create action configuration data for implementing a plurality of functions in the device includes a first management unit configured to manage a first version of firmware for implementing a plurality of functions in the device and a second version of a schema usable in the firmware of the first version, a second management unit configured to manage the action configuration data, which has been created based on information managed by the first management unit, and the second version, and a transmission unit configured to, in response to a request from the device, specify the action configuration data managed by the second management unit and to transmit the specified action configuration data and the first version to the device.

6 Claims, 17 Drawing Sheets

(56) References Cited

U.S. PATENT DOCUMENTS

| | | | |
|---|---|---|---|
| 2013/0346959 A1* | 12/2013 | Tanaka | G06F 8/65 |
| | | | 717/170 |
| 2014/0047430 A1* | 2/2014 | Kanematsu | H04N 1/00973 |
| | | | 717/170 |
| 2014/0355049 A1* | 12/2014 | Hadano | G06F 3/1287 |
| | | | 358/1.15 |
| 2015/0347124 A1* | 12/2015 | Sotani | G06F 8/654 |
| | | | 717/170 |
| 2018/0060063 A1* | 3/2018 | Sato | H04L 67/34 |
| 2018/0060064 A1* | 3/2018 | Okamoto | G06F 8/654 |
| 2018/0088871 A1* | 3/2018 | Takamoto | G06F 3/1287 |
| 2018/0088872 A1* | 3/2018 | Nishimura | G06F 3/1285 |
| 2018/0314511 A1* | 11/2018 | Butcher | G06F 8/654 |
| 2019/0095192 A1* | 3/2019 | Akita | G06F 3/1285 |

* cited by examiner

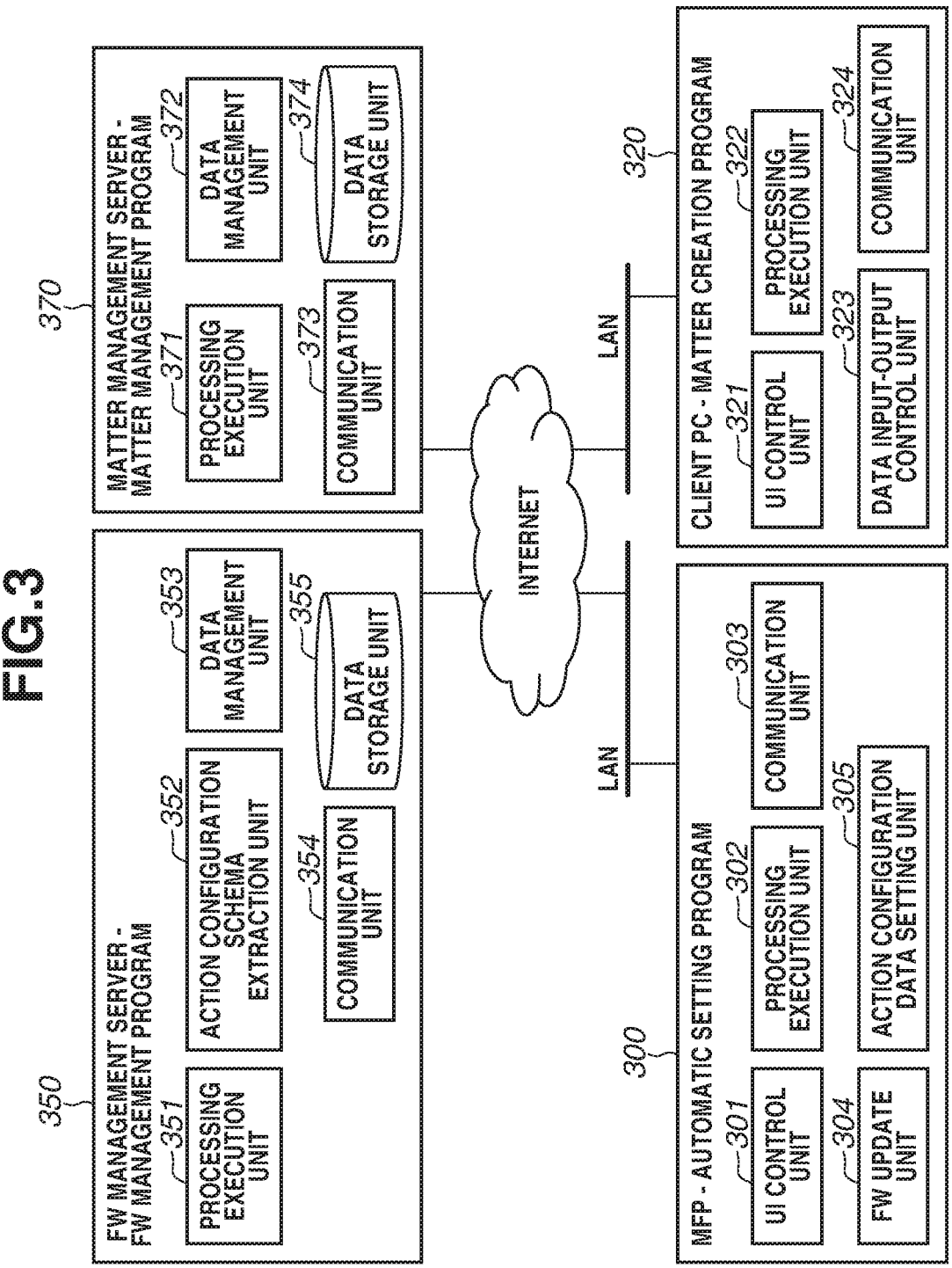

FIG.4

| | 402 | 403 | |
|---|---|---|---|
| FW VERSION | 10.0 | 20.0 | 30.0 |
| LIBRARY A | 5.0 | 6.0 | 6.0 |
| ... | ... | ... | ... |
| ACTION CONFIGURATION SCHEMA LIBRARY | 1.0 | 1.0 | 2.0 |
| ... | ... | ... | ... |
| LIBRARY Z | 8.0 | 8.0 | 8.0 |

500 — VERSION 1.0

| ACTION SETTING ITEM (501) | INITIAL VALUE (502) | SPECIFICATIONS OF INPUT VALUES (503) |
|---|---|---|
| SLEEP TRANSITION TIME | 1 HOUR | 5 MINUTES / 1 HOUR / 6 HOURS / 12 HOURS |
| DATA ERASURE METHOD | ZERO DATA ONCE | ZERO DATA ONCE / RANDOM DATA ONCE / RANDOM DATA THRICE |
| DATA COMPRESSION RATE | NORMAL | HIGH COMPRESSION / NORMAL / LOW COMPRESSION |

510 — VERSION 2.0

| ACTION SETTING ITEM (511) | INITIAL VALUE (512) | SPECIFICATIONS OF INPUT VALUES (513) |
|---|---|---|
| SLEEP TRANSITION TIME | 1 HOUR | 5 MINUTES / 1 HOUR / 6 HOURS / 12 HOURS |
| DATA ERASURE METHOD | ZERO DATA THRICE | ZERO DATA THRICE / RANDOM DATA THRICE / DoD |
| DATA COMPRESSION RATE | NORMAL | HIGH COMPRESSION / NORMAL / LOW COMPRESSION |

FIG.5B

520 — setting_A111.data

| ACTION SETTING ITEM (521) | SETTING VALUE (522) |
|---|---|
| SLEEP TRANSITION TIME | 5 MINUTES |
| DATA ERASURE METHOD | RANDOM DATA ONCE |
| DATA COMPRESSION RATE | NORMAL |

FIG.6A

| MATTER NUMBER | MODEL | MATTER NAME | ACTION CONFIGURATION DATA FILE | ACTION CONFIGURATION SCHEMA VERSION |
|---|---|---|---|---|
| 601 | 602 | 603 | 604 | 605 |
| A001 | MFP-X | NAME a1 | setting_A001.data | 1.0 |
| A002 | MFP-X | NAME a2 | setting_A002.data | 1.0 |
| A111 | MFP-X | NAME a111 | setting_A111.data | 1.0 |
| ... | ... | ... | ... | |

| MATTER NUMBER | MODEL | MATTER NAME | ACTION CONFIGURATION DATA FILE | FW VERSION |
|---|---|---|---|---|
| 611 | 612 | 613 | 614 | 615 |
| B001 | MFP-X | NAME b1 | setting_B001.data | 10.0 |
| B002 | MFP-X | NAME b2 | setting_B002.data | 20.0 |
| B111 | MFP-X | NAME b111 | setting_B111.data | 20.0 |
| ... | ... | ... | ... | |

FIG.8A

AT THE TIME OF MATTER DATA CREATION

| FW VERSION | 10.0 |
|---|---|
| PACKAGE A | 5.0 |
| ACTION CONFIGURATION SCHEMA PACKAGE | 1.0 |
| . . . | . . . |

AT THE TIME OF MFP SETTING

| FW VERSION | 10.0 | 20.0 | 30.0 |
|---|---|---|---|
| PACKAGE A | 5.0 | 6.0 | 6.0 |
| ACTION CONFIGURATION SCHEMA PACKAGE | 1.0 | 1.0 | 2.0 |
| . . . | . . . | . . . | . . . |

FIG.13A

ACTION SETTING VALUES (UNAPPLIED) IN MFP

| ACTION SETTING ITEM | SETTING VALUE |
|---|---|
| SLEEP TRANSITION TIME | 1 HOUR |
| DATA ERASURE METHOD | ZERO DATA ONCE |
| DATA COMPRESSION RATE | NORMAL |

ACTION SETTING VALUES (APPLIED) IN MFP

| ACTION SETTING ITEM | SETTING VALUE |
|---|---|
| SLEEP TRANSITION TIME | 5 MINUTES |
| DATA ERASURE METHOD | RANDOM DATA ONCE |
| DATA COMPRESSION RATE | NORMAL |

1400 AT THE TIME OF MATTER DATA CREATION

| FW VERSION | 10.0 |
|---|---|
| ACTION CONFIGURATION SCHEMA PACKAGE | 1.0 |

1410 AT THE TIME OF MFP SETTING 1411

| FW VERSION | 10.0 | 20.0 | 30.0 | 40.0 | 50.0 |
|---|---|---|---|---|---|
| ACTION CONFIGURATION SCHEMA PACKAGE | 1.0 | 1.0 | 2.0 | 2.0 | 3.0 |

VERSION 1.0

| ACTION SETTING ITEM | INITIAL VALUE | SPECIFICATIONS OF INPUT VALUES |
|---|---|---|
| JOB STORAGE PERIOD | 1 DAY | 1 HOUR / 12 HOURS / 1 DAY / 1 WEEK / NONE |
| DATA ERASURE METHOD | ZERO DATA ONCE | ZERO DATA ONCE / RANDOM DATA ONCE / RANDOM DATA THRICE |

1510

VERSION 2.0

| ACTION SETTING ITEM | INITIAL VALUE | SPECIFICATIONS OF INPUT VALUES |
|---|---|---|
| JOB STORAGE PERIOD | 1 DAY | 1 HOUR / 12 HOURS / 1 DAY / 1 WEEK / NONE |
| DATA ERASURE METHOD | ZERO DATA THRICE | ZERO DATA THRICE / RANDOM DATA ONCE / RANDOM DATA THRICE |

1520

VERSION 3.0

| ACTION SETTING ITEM | INITIAL VALUE | SPECIFICATIONS OF INPUT VALUES |
|---|---|---|
| JOB STORAGE PERIOD | 1 DAY | 1 HOUR / 12 HOURS / 1 DAY / 1 WEEK / 1 YEAR |
| DATA ERASURE METHOD | ZERO DATA THRICE | ZERO DATA THRICE / RANDOM DATA ONCE / RANDOM DATA THRICE |

| ACTION SETTING ITEM | ACTION SETTING VALUE |
|---|---|
| JOB STORAGE PERIOD | NONE |

1560

| ACTION SETTING ITEM | ACTION SETTING VALUE |
|---|---|
| DATA ERASURE METHOD | ZERO DATA ONCE |

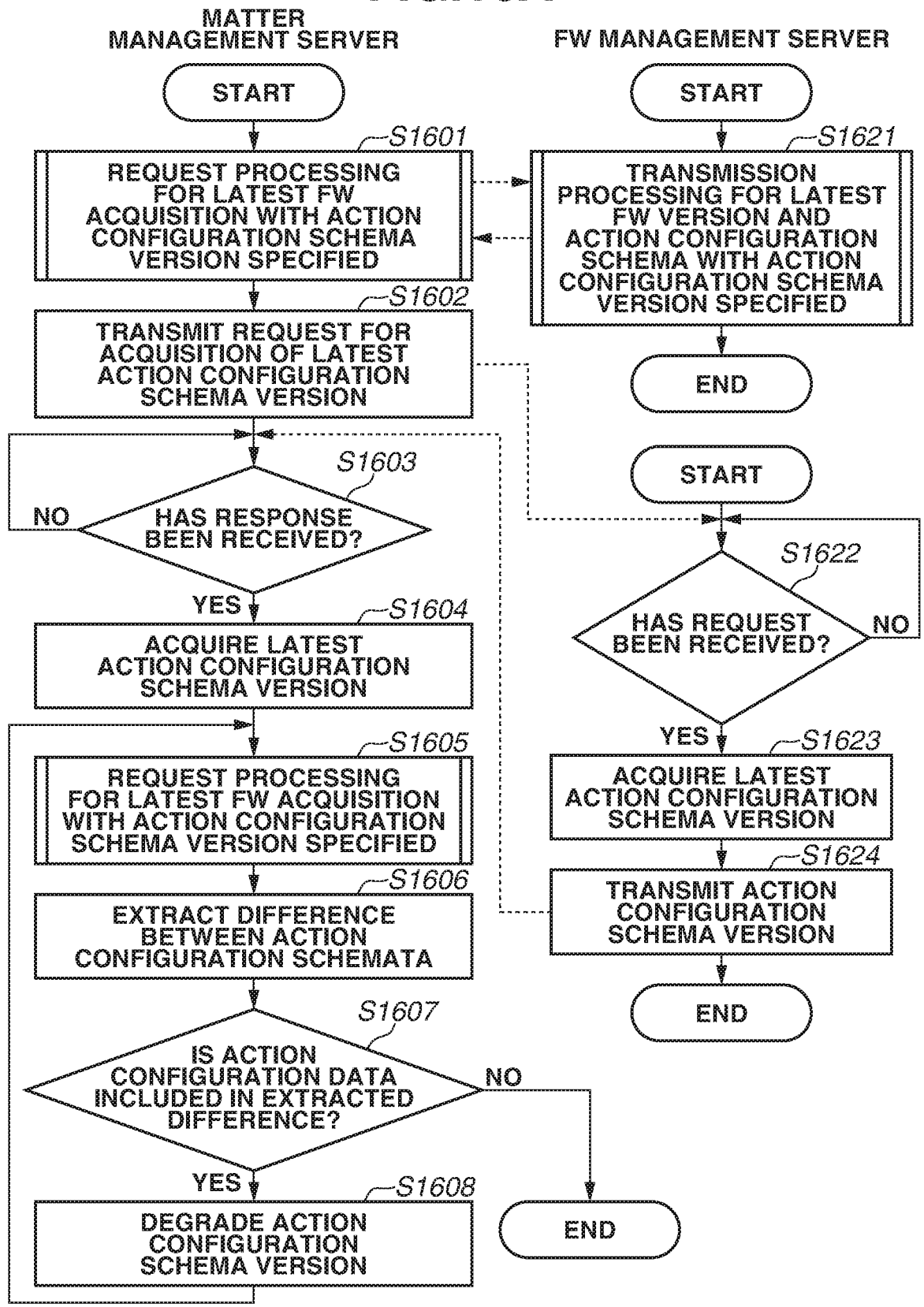

INFORMATION PROCESSING SYSTEM AND CONTROL METHOD

BACKGROUND

Field of the Disclosure

Aspects of the present disclosure generally relate to an information processing system and a control method.

Description of the Related Art

Usually, when a device typified by a multifunction peripheral is newly introduced, a setting operation compatible with a client environment is needed. Such a setting operation for the device requires much time and labor. Therefore, there is a proposed system, in which, in the case of performing a similar setting operation with respect to a plurality of devices, common data such as software and setting information necessary for setting is previously prepared as a setting instruction. Then, performing processing according to the setting instruction enables even an operator unaccustomed to setting of multifunction peripherals (for example, a person in charge of delivery of a multifunction peripheral to a customer) to automatically and efficiently perform the setting operation.

Moreover, recent image forming apparatuses have become having a great number of functions, and switching of actions of those functions has become able to be set in a more detailed way. With regard to items of such actions, action setting items and settable values are defined as an action configuration schema for every machine model and every firmware (hereinafter referred to as "FW") version, and the user sets values adapted for an intended use in conformity with specifications of the action configuration schema and creates the set values as action configuration data. Such action configuration data which the user intends to set is also configured to be previously included in the setting instruction mentioned above, thus automating a setting operation.

However, since action configuration data is data created in conformity with an action configuration schema, which differs in specifications for every machine model and every FW, there is an issue that, unless an FW version is fixed, it is impossible to create action configuration data. Moreover, in the case of, for example, a large-scale business deal, a time lag may occur between the time of creation of action configuration data and the time of setting of multifunction peripherals (MFPs), and the time lag may be a period of several months or several years. Therefore, there is an issue that, if setting is performed on FW different from the created FW version, values set with the action configuration data are not correctly set. Additionally, since the action configuration data creator and the MFP setting person are different, there is an issue that, when values are not correctly set, it is difficult for the MFP setting person to make an appropriate judgment.

Japanese Patent Application Laid-Open No. 2017-191512 discusses a technique which causes FW and action configuration data intended for setting to be included in a firmware set, delivers the FW and the action configuration data as a set, and applies the action configuration data after updating of the FW.

However, in the technique discussed in Japanese Patent Application Laid-Open No. 2017-191512, since an FW version and action configuration data are managed as a set, it is impossible to change the FW version intended for setting to a multifunction peripheral (for example, in a case where a newer FW version has been released, to apply the newer FW version). Accordingly, in the case of changing the FW version, it may be necessary to review the action configuration data again and re-create action configuration data if the need arises.

SUMMARY

According to embodiments of the present disclosure, an information processing system including a device and a client terminal which is able to create action configuration data for implementing a plurality of functions in the device includes a first management unit configured to manage a first version of firmware for implementing a plurality of functions in the device and a second version of a schema usable in the firmware of the first version, a second management unit configured to manage the action configuration data, which has been created based on information managed by the first management unit, and the second version, and a transmission unit configured to, in response to a request from the device, specify the action configuration data managed by the second management unit and to transmit the specified action configuration data and the first version to the device.

Further features of the present disclosure will become apparent from the following description of exemplary embodiments with reference to the attached drawings.

BRIEF DESCRIPTION I/F THE DRAWINGS

FIG. 1 is a diagram illustrating an example of a system configuration of an information processing system.

FIGS. 2A, 2B, and 2C are diagrams illustrating examples of hardware configurations which constitute the information processing system.

FIG. 3 is a diagram illustrating examples of software configurations of apparatuses which constitute the information processing system.

FIG. 4 is a diagram illustrating an example of a firmware (FW) configuration.

FIGS. 5A and 5B are diagrams illustrating examples of action configuration schemata and action configuration data in a first exemplary embodiment.

FIGS. 6A and 6B are diagrams illustrating examples of matter management data.

FIGS. 8A and 8B are diagrams illustrating examples of FW management data in the first exemplary embodiment.

Figure 9A:
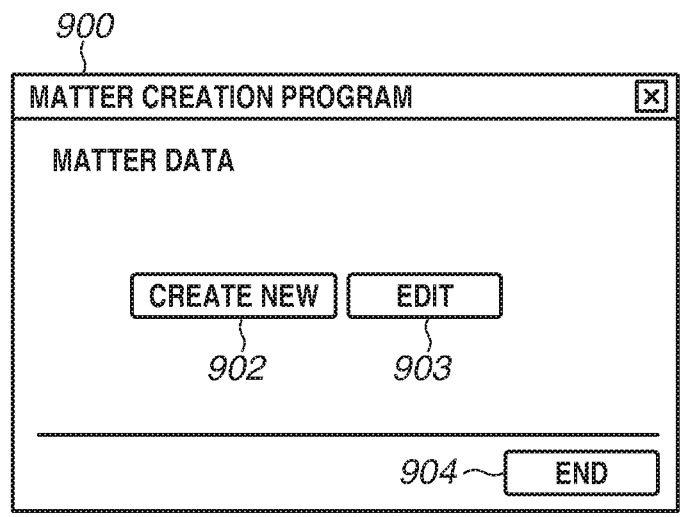
Figure 9B:
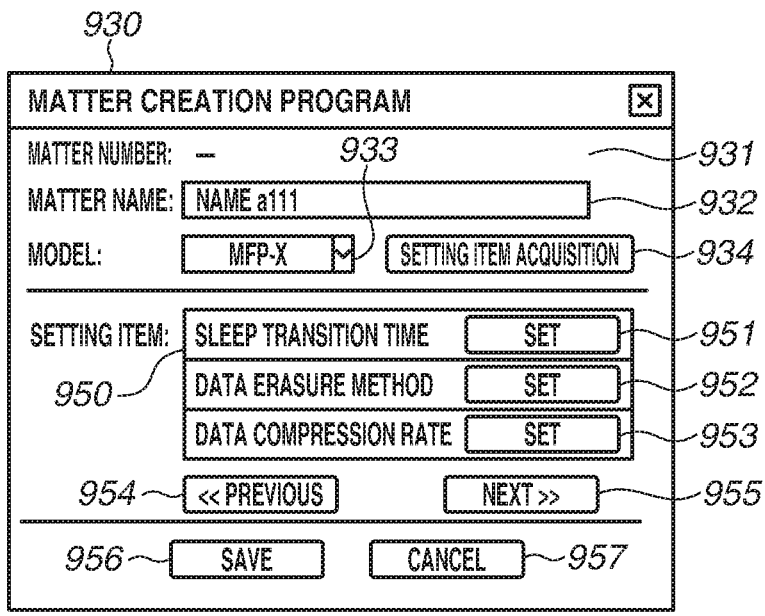
Figure 9C:
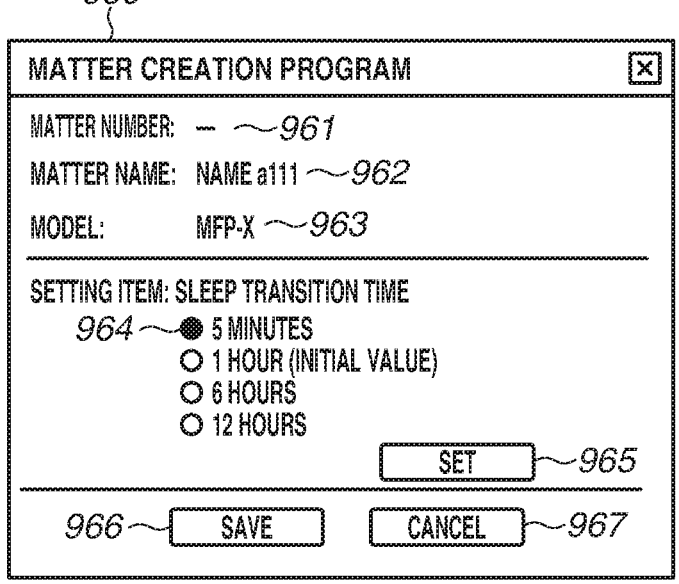

FIGS. 9A, 9B, and 9C are diagrams illustrating examples of user interfaces (UIs) of a client personal computer (PC).

Figure 10:
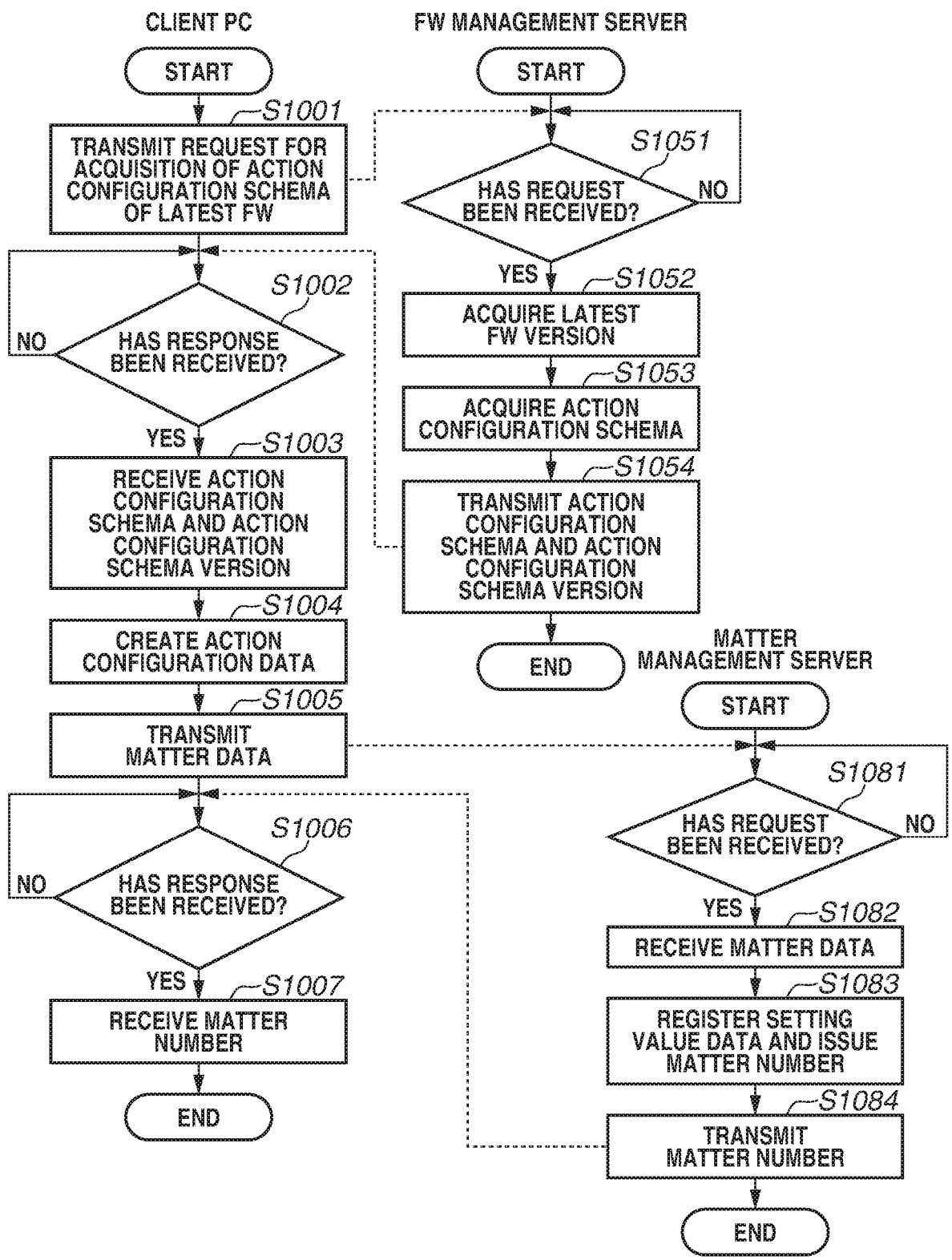

FIG. 10 is a flowchart (first flowchart) illustrating an example of information processing in the first exemplary embodiment.

Figure 11A:
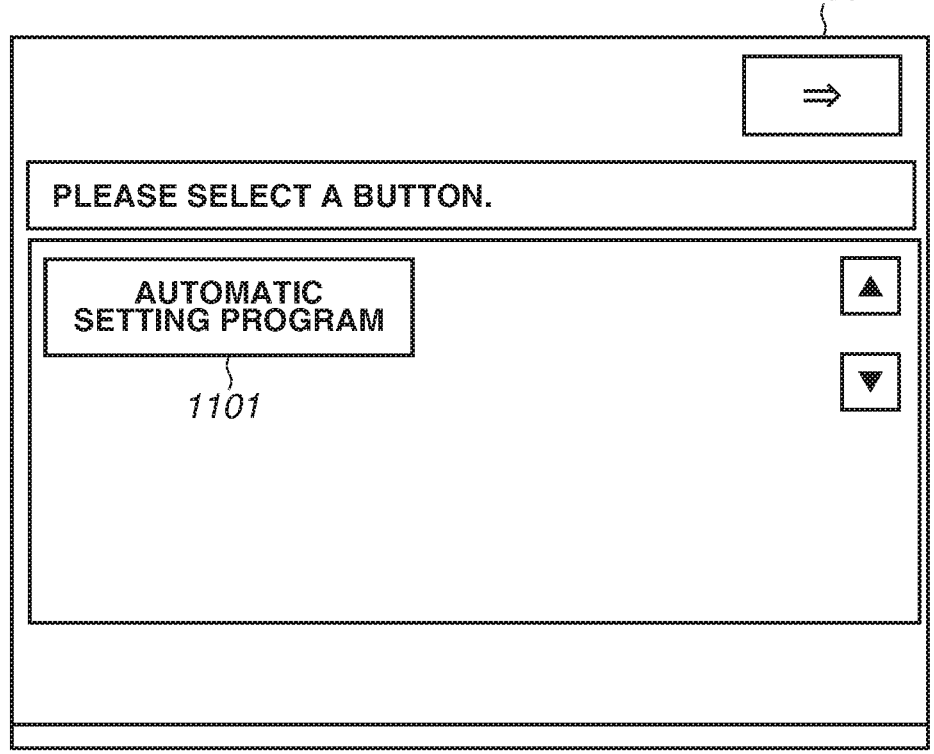
Figure 11B:
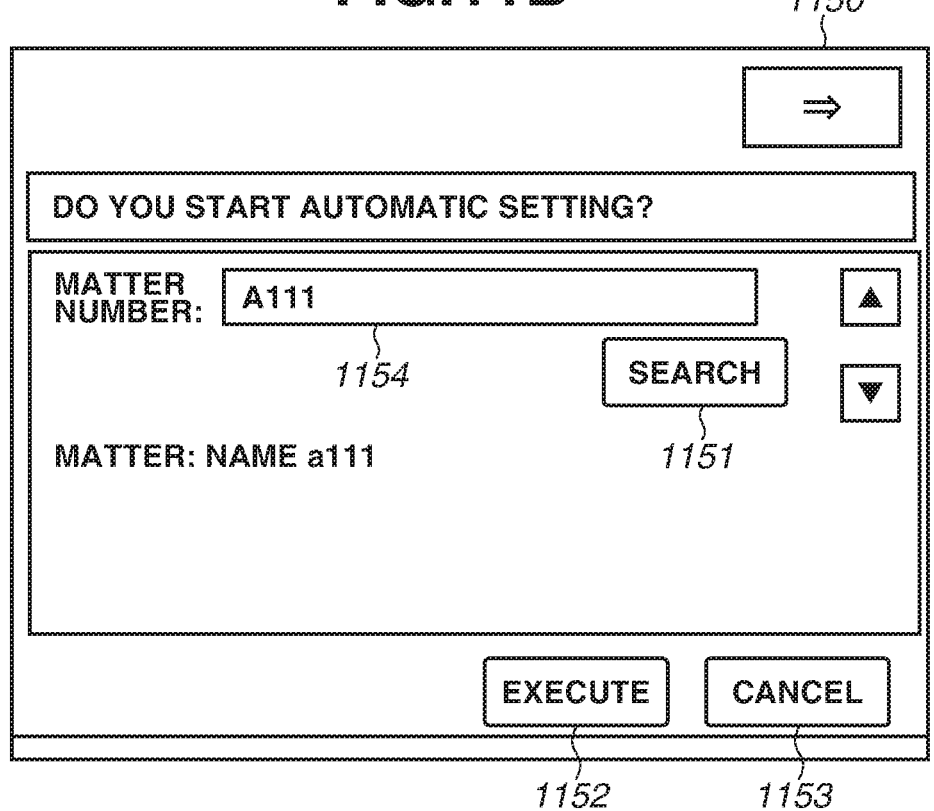

FIGS. 11A and 11B are diagrams illustrating examples of UIs of the MFP.

Figure 12:
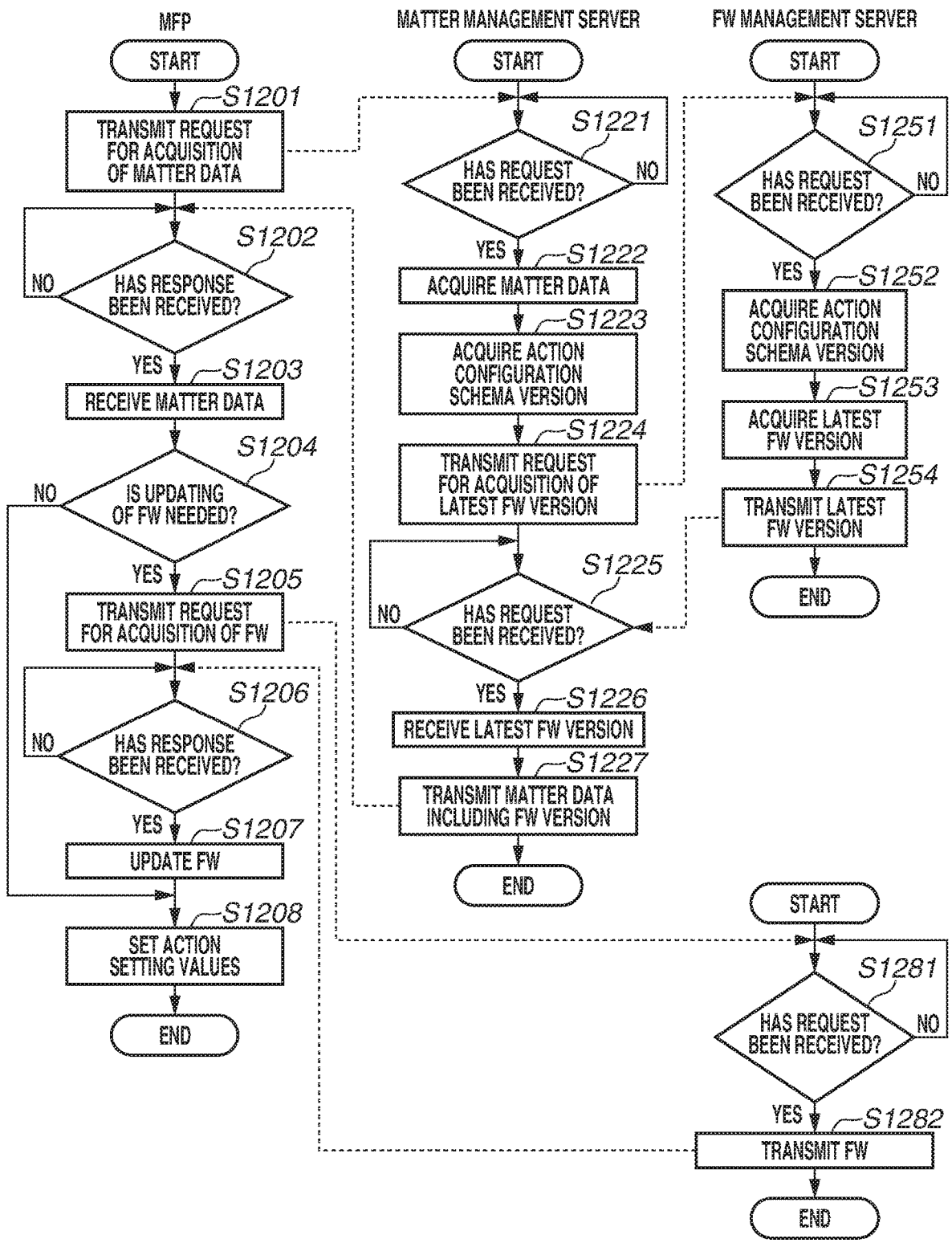

FIG. 12 is a flowchart (second flowchart) illustrating an example of information processing in the first exemplary embodiment.

FIGS. 13A and 13B are diagrams illustrating examples of action setting values for the MFP.

FIG. 14 is a diagram illustrating examples of FW management data in a second exemplary embodiment.

FIGS. 15A and 15B are diagrams illustrating examples of action configuration schemata and action configuration data in the second exemplary embodiment.

Figure 16B:
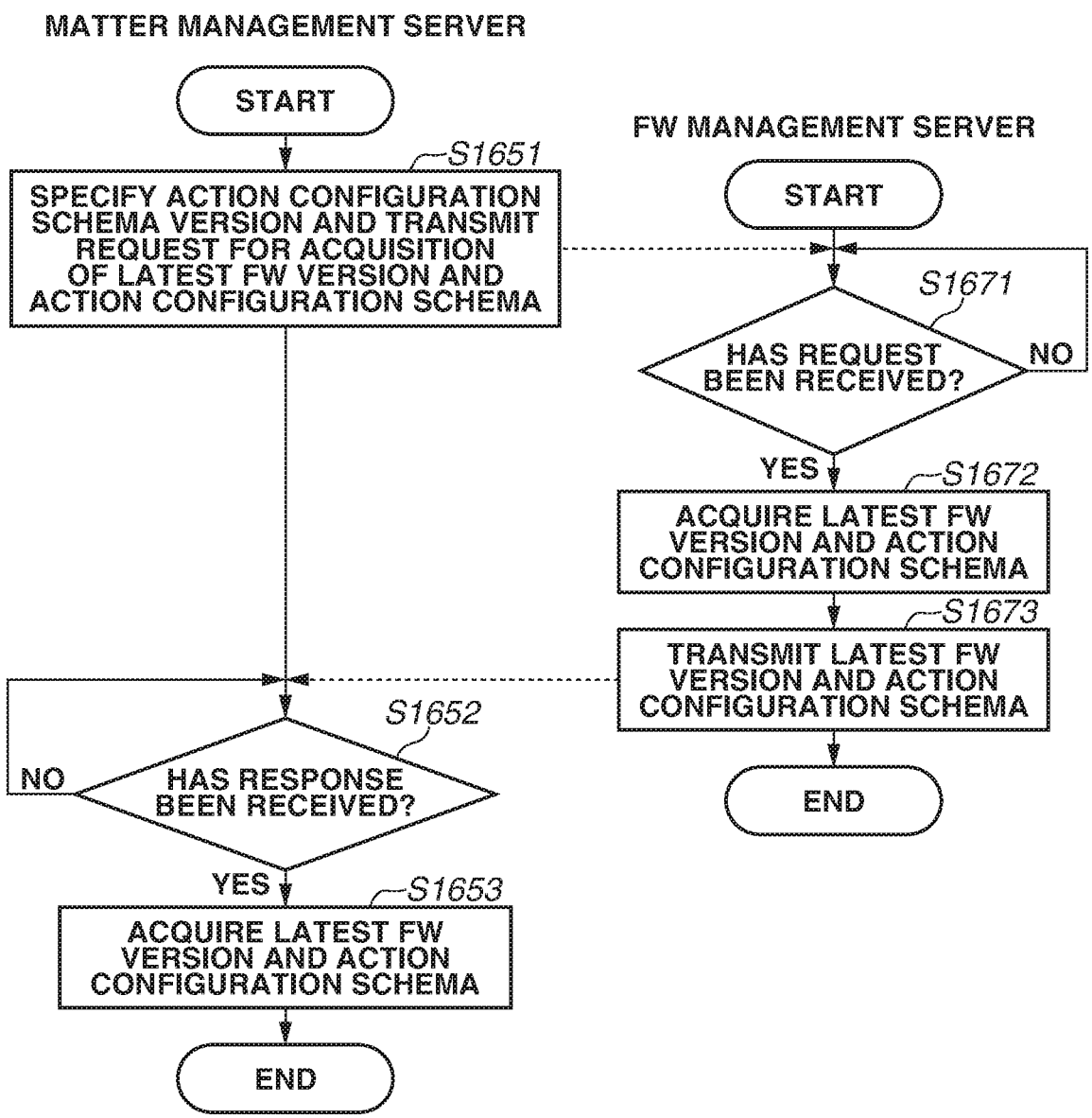

FIGS. 16A and 16B are flowcharts illustrating an example of information processing in the second exemplary embodiment.

DESCRIPTION I/F THE EMBODIMENTS

Various exemplary embodiments, features, and aspects of the disclosure will be described in detail below with reference to the drawings.

First, the following terms are defined as follows. Action configuration data includes action setting items and action setting values which are set in the respective action setting items. Moreover, an action configuration schema is specification definition data for action setting information and is included in firmware (FW) of a multifunction peripheral, and the contents of the action configuration schema include, for example, action setting items, initial values corresponding to the respective action setting items, and values allowed to be input. Moreover, the action configuration schema retains a version thereof and is managed with the version. In different action configuration schema versions, the specifications of action setting items or values corresponding to the respective items are different. Action setting items are items with respect to which actions of a multifunction peripheral are switched. For example, the action setting items include an automatic sleep transition time after the elapse of which the multifunction peripheral enters energy-saving mode, information indicating whether to use a universal serial bus (USB) device, and a printing priority order. With respect to these items, the user specifying action setting values in conformity with values allowed to be input defined in the action configuration schema enables switching actions of the multifunction peripheral to desired actions. For example, in the printing priority order, values allowed to be input are assumed to be of the selection type of "copy→saved file" or "saved file→copy". In a case where the user has set "copy→saved file" as an action setting value, copy is set to be higher in priority of printing than a saved file.

Figure 1:
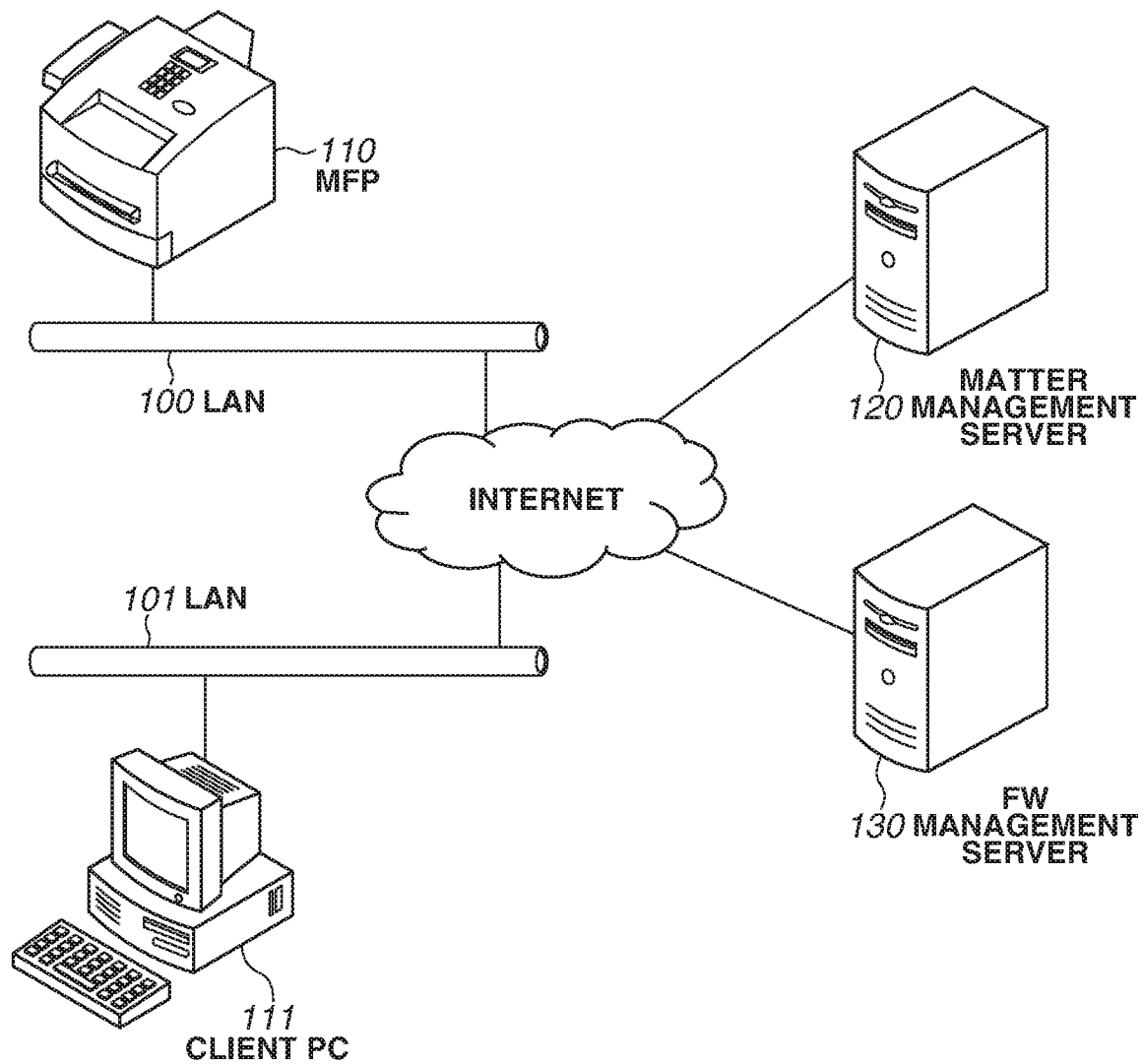

FIG. 1 is a diagram illustrating an example of a system configuration of an information processing system according to a first exemplary embodiment. A local area network (LAN) 100 is a LAN in an environment in which to perform setting, and a multifunction peripheral (MFP) 110 is connected to the LAN 100. The MFP 110 is a multifunction peripheral in which a plurality of functions of, for example, a scanner and a printer is integrated with a copying machine, and an automatic setting program 300 described below is installed on the MFP 110 or is incorporated in firmware of the MFP 110. The MFP 110 is an example of each of a device and an image forming apparatus. A central processing unit (CPU) 201 described below of the MFP 110 is configured to acquire matter data (FIGS. 6A and 6B described below) from a matter management server 120 according to the automatic setting program 300 and to automatically perform a setting operation according to the contents of a setting instruction. Moreover, the CPU 201 downloads specified FW from an FW management server 130 according to the contents of the setting instruction based on the automatic setting program 300. A LAN 101 is an environment in which to make an advance preparation for setting, and a client personal computer (PC) 111 is connected to the LAN 101. The client PC 111 is an information processing apparatus such as a personal computer, and a matter creation program 320 described below is installed on the client PC 111. A CPU 251 described below of the client PC 111 generates matter data including action configuration data 520 based on a matter creation program 320 and transmits the generated matter data to the matter management server 120. The matter management server 120 has a matter management program 370 described below installed thereon. A CPU 281 described below of the matter management server 120 manages the generated matter data based on the matter management program 370. The FW management server 130 has an FW management program 350 described below installed thereon. The FW management program 350 manages firmware which is able to be used by an MFP. In the first exemplary embodiment, the matter management server 120 and the FW management server 130 are configured as respective independent servers, but can be configured as a single management apparatus. Moreover, while, in the first exemplary embodiment, an MFP is taken as an example of an information processing apparatus, besides, for example, a single function peripheral (SFP) can be taken. The client PC 111 is an example of a client terminal which is able to create action configuration data for implementing a plurality of functions.

<MFP>

Figure 2A:
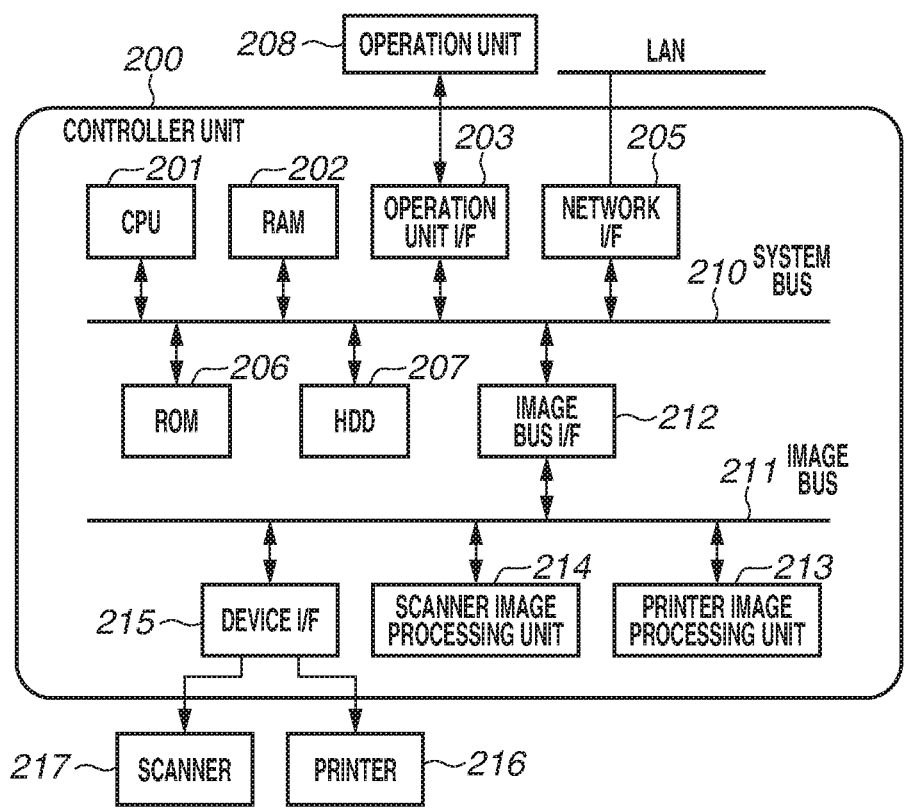
Figure 2B:
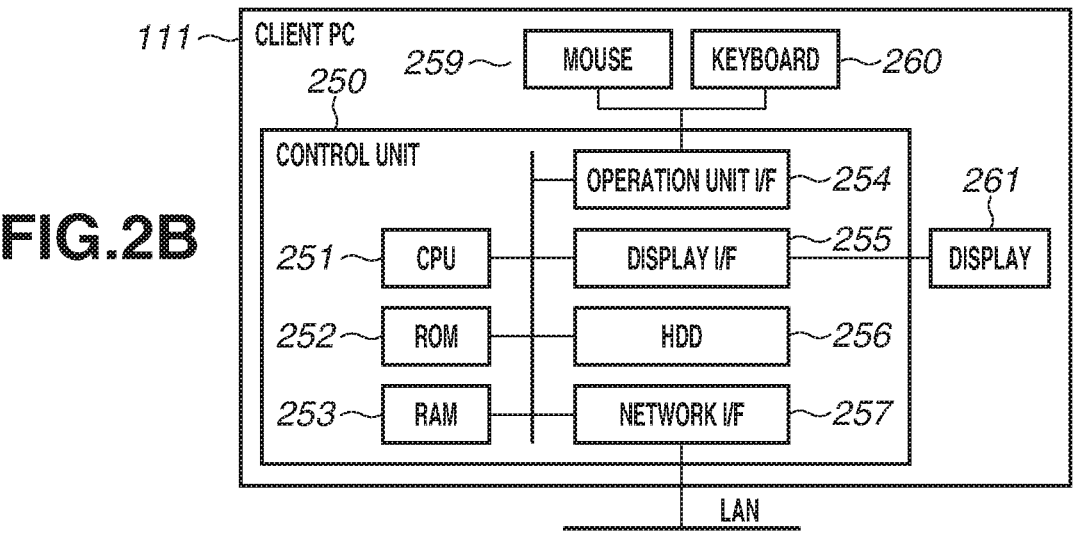
Figure 2C:
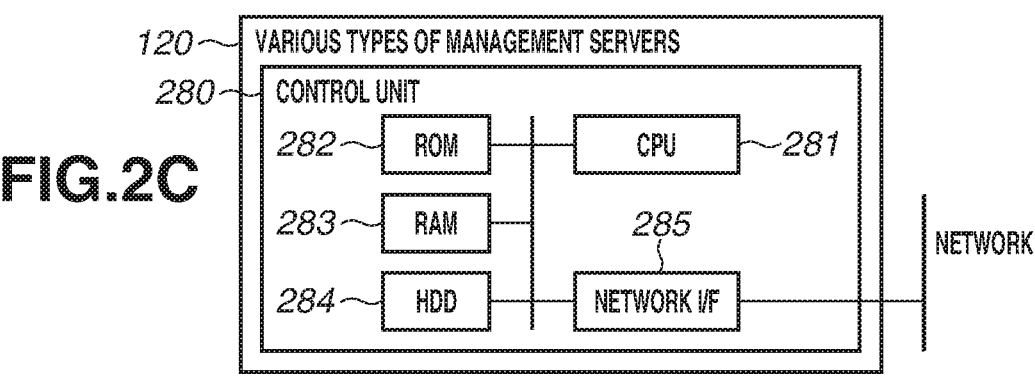

FIGS. 2A, 2B, and 2C are diagrams illustrating examples of hardware configurations of apparatuses which constitute the information processing system illustrated in FIG. 1. In particular, FIG. 2A illustrates an example of a hardware configuration of the MFP 110. Referring to FIG. 2A, the MFP 110 includes a controller unit 200, and, to the controller unit 200, a scanner 217 serving as an image input device and a printer 216 serving as an image output device are connected and an operation unit 208 is also connected. The controller unit 200 performs control to implement a copy function, which prints and outputs image data read by the scanner 217 with use of the printer 216. The controller unit 200 includes a CPU 201, which is a processor. The CPU 201 launches an operating system (OS) by a boot program stored in a read-only memory (ROM) 206. The CPU 201 executes, on the OS, a program stored in a hard disk drive (HDD) 207, thus performing various processing operations. A random access memory (RAM) 202 is used as a work area for the CPU 201. The HDD 207 stores programs and image data. The ROM 206, the RAM 202, and an operation unit interface (operation unit I/F) 203 are connected to the CPU 201 via a system bus 210. Additionally, a network interface (network I/F) 205 and an image bus interface (image bus I/F) 212 are also connected to the CPU 201. The operation unit I/F 203 is an interface for use with the operation unit 208, which has a touch panel, and outputs, to the operation unit 208, image data which is to be displayed on the operation unit 208. Moreover, the operation unit I/F 203 transmits, to the CPU 201, information input by the user via the operation unit 208. The network I/F 205 is an interface used for connecting the MFP 110 to the LAN 100. The image bus I/F 212 is a bus bridge for connecting the system bus 210 and an image bus 211, which is used to transfer image data at high speed, to each other to convert a data format. The image bus 211 is configured with, for example, a Peripheral Component Interconnect (PCI) bus or an IEEE 1394 bus. A device I/F 215, a scanner image processing unit 214, and a printer image processing unit 213 are provided on the image bus 211. The scanner 217 and the printer 216 are connected to the device I/F 215, and the device I/F 215 performs conversion between a synchronous system and an asynchronous system for image data. The scanner image processing unit 214 performs correction, processing, and editing on the input image data. The printer image processing unit 213 performs, for example, correction and resolution conversion corresponding to a printer with respect to print output image data.

<Client PC>

FIG. 2B is a diagram illustrating an example of a hardware configuration of the client PC 111. Referring to FIG. 2B, a control unit 250 including the CPU 251 controls the entire operation of the client PC 111. The CPU 251 reads out a control program stored in a ROM 252 and performs various control processing operations. A RAM 253 is used as a temporary storage region, such as a main memory or work area, for the CPU 251. An HDD 256 stores image data and various programs. An operation unit I/F 254 is an interface which is used to connect to a user interface terminal to which a control operation on a program which is to be executed by the client PC 111 is input. While, in the first exemplary embodiment, the user interface terminal is configured with a mouse 259 and a keyboard 260, the first exemplary embodiment is not limited to this. A display I/F 255 is an interface which is used to connect to a display terminal which displays a user interface (UI) (screen) for a program which is to be executed by the client PC 111. While, in the first exemplary embodiment, the display terminal is configured with a display 261, the first exemplary embodiment is not limited to this. A network I/F 257 is an interface which is used to connect the control unit 250 to the LAN 101. The network I/F 257 performs transmission and reception of various pieces of information with respect to other apparatuses via the network.

<Server>

FIG. 2C is a diagram illustrating an example of a hardware configuration of each of various management servers (120 and 130) illustrated in FIG. 1. Referring to FIG. 2C, a control unit 280 including a CPU 281 controls an operation of the entire management server. The CPU 281 reads out a control program stored in a ROM 282 and performs various control processing operations. A RAM 283 is used as a temporary storage region, such as a main memory or work area, for the CPU 281. An HDD 284 stores various programs, FW, and matter data. A network I/F 285 is an interface for connecting the control unit 280 to a LAN or a network. The network I/F 285 is used to transmit and receive various pieces of information with respect to other apparatuses via the network.

<Software Configurations of Respective Programs>

FIG. 3 is a diagram illustrating examples of software configurations of programs which run on the MFP 110, the client PC 111, and various management servers (120 and 130). The CPU 201 executing the automatic setting program 300 causes the respective functions of the automatic setting program 300 of the MFP 110 to be implemented. Details of the respective functions are described. A UI control unit 301 provides a UI for operating the automatic setting program 300 to the user via the operation unit 208 and performs processing for receiving an operation performed by the user. A processing execution unit 302 performs processing for executing various processing operations. A communication unit 303 performs transmission and reception of data required for performing processing with respect to various management servers (120 and 130). An FW update unit 304 performs update processing for FW. An action configuration data setting unit 305 performs setting processing of action configuration data.

The CPU 251 executing the matter creation program 320 causes the respective functions of the matter creation program 320 of the client PC 111 to be implemented. Details of the respective functions are described. A UI control unit 321 provides a UI for operating the matter creation program 320 to the user via the display 261, and receives an operation performed by the user via the mouse 259 and the keyboard 260. A processing execution unit 322 performs processing for executing various processing operations. A data input-output control unit 323 performs processing for receiving an operation input from the user according to an instruction from the UI control unit 321. A communication unit 324 performs processing for transmitting and receiving data with respect to, for example, various management servers (120 and 130) according to an instruction from each processing unit.

The CPU 281 executing the FW management program 350 causes the respective functions of the FW management program 350 of the FW management server 130 to be implemented. Details of the respective functions are described. A data storage unit 355 stores pieces of FW (illustrated in FIGS. 8A and 8B described below) which are managed for every machine model of the MFP 110 and action configuration schemata (500 and 510) included in the respective pieces of FW. A data management unit 353 performs processing for managing various pieces of data stored in the data storage unit 355. A processing execution unit 351 performs processing for executing various processing operations. An action configuration schema extraction unit 352 acquires an action configuration schema stored in the data storage unit 355. Alternatively, the action configuration schema extraction unit 352 extracts an action configuration schema from FW stored in the data storage unit 355. A communication unit 354 performs processing for transmitting and receiving data with respect to the MFP 110, the client PC 111, and the matter management server 120 according to an instruction from each processing unit.

The CPU 281 executing the matter management program 370 causes the respective functions of the matter management server 120 to be implemented. Details of the respective functions are described. A data storage unit 374 stores matter data (illustrated in FIGS. 6A and 6B described below) which is to be set to the MFP 110. A data management unit 372 performs processing for managing matter management data stored in the data storage unit 355. A processing execution unit 371 performs processing for executing various processing operations. A communication unit 354 performs processing for transmitting and receiving data with respect to the MFP 110, the client PC 111, and the FW management server 130 according to an instruction from each processing unit.

<Firmware>

FIG. 4 is a diagram illustrating an example of an FW configuration of the MFP 110, which is managed by the data storage unit 355 of the FW management server 130. FW is managed as an aggregation of a plurality of libraries. Moreover, FW and each library retain the respective versions and are managed with the respective versions. As one of libraries, there is an action configuration schema library (action configuration schema version) 401, which manages an action configuration schema. If, in FW, at least one library is modified (changed in version) or a new library is added or a library is deleted, the version number thereof is changed. For example, the reason why the version is changed from "10.0" to "20.0" is that the version of a library A has been changed. An example of the version change of an action configuration schema library is described below with reference to FIGS. 5A and 5B. An FW version illustrated in FIG. 4 is an example of a first version of firmware for implementing a plurality of functions in an MFP. An action configuration schema library illustrated in FIG. 4 is an example of a second version of a schema which is able to be used in the firmware.

<Action Configuration Schema>

FIG. 5A is a diagram illustrating an example of an action configuration schema included in FW (FIG. 4). The action configuration schema is retained in the action configuration schema library 401 included in FW. Moreover, the action configuration schema includes an action setting item (501 or 511), an initial value (502 or 512), and specifications of input values (503 or 513). The action setting item allows switching of actions, and the initial value is an initial value of the action setting item. In a case where the user does not set a specific action setting value, the initial value will be set. An action configuration schema 500 is an action configuration schema included in an action configuration schema library "1.0". An action configuration schema 510 is an action configuration schema included in an action configuration schema library "2.0". Moreover, while, in the first exemplary embodiment, an action configuration schema in which specifications of input values are of the selection type is taken as an example, the specifications of input values can be specifications of, for example, the limitation of a character string length or the range specification of numerical values. FIG. 5B is a diagram illustrating an example of action configuration data. Action configuration data 520 is generated by the matter creation program 320. Moreover, the action configuration data 520 is data in which a setting value 522 intended for setting is defined with respect to an action setting item 521, which is defined in the action configuration schema. For example, in the case illustrated in FIG. 5B, the action configuration data 520 indicates that "5 minutes" is set to a sleep transition time, "random data once" is set to a data erasure method, and "normal" is set to a data compression rate.

<Matter Management Data>

FIGS. 6A and 6B are diagrams illustrating examples of matter management data which is managed by the data storage unit 374 of the matter management server 120. FIGS. 6A and 6B illustrate examples of matter management data tables which are managed by the data storage unit 374. While the table configurations illustrated in FIGS. 6A and 6B have redundant portions left for ease of description, a table configuration different from the illustrated example, in which, for example, in the case of a relational database or the like, normalization is performed to remove redundancy, can be employed. FIG. 6A illustrates a table in which outlines of matters are stored and which is composed of a column 601 to a column 605. One record represents one matter. The column 601 represents a matter number. The matter number is an identifier for uniquely identifying matter data. The column 602 represents an MFP model targeted for setting. The column 603 represents the name of matter data. The column 604 represents an action configuration data file. While, in the first exemplary embodiment, the entity of the action configuration data file is stored in the column 604, a configuration in which only a path to the entity of the action configuration data file is stored in the column 604 and the entity of the action configuration data file is placed as a file at another location can also be employed. The column 605 represents an action configuration schema version which was used as a reference when the action configuration data file stored in the column 604 was created. Referring to the first record, it can be seen that the action configuration data file "setting_A001.data" was created with the action configuration schema version "1.0" used as a reference. Moreover, the table in which outlines of matters are stored can be a table such as that illustrated in FIG. 6B. The table illustrated in FIG. 6B differs from the table illustrated in FIG. 6A in the column 605 and a column 615. The column 615 represents an FW version including an action configuration schema version which was used as a reference when the action configuration data file was created. Referring to the first record, it can be seen that the action configuration data file "setting_B001.data" was created with an action configuration schema version included in the FW version "10.0" used as a reference. Additionally, in a case where an FW configuration illustrated in FIG. 4 is employed, the action configuration schema version included in the FW version "10.0" (402) is "1.0". Accordingly, referring to the first record, it can be seen that the action configuration data file "setting_B001.data" was created with the action configuration schema version "1.0" used as a reference. While, here, an action configuration schema version or an FW version is used as a factor which is able to identify an action configuration schema version which was used as a reference when the action configuration data file was created, the first exemplary embodiment is not limited to this as long as any factor which is able to identify the action configuration schema version is employed.

<Automatic Setting Operation Procedure of MFP>

Figure 7:
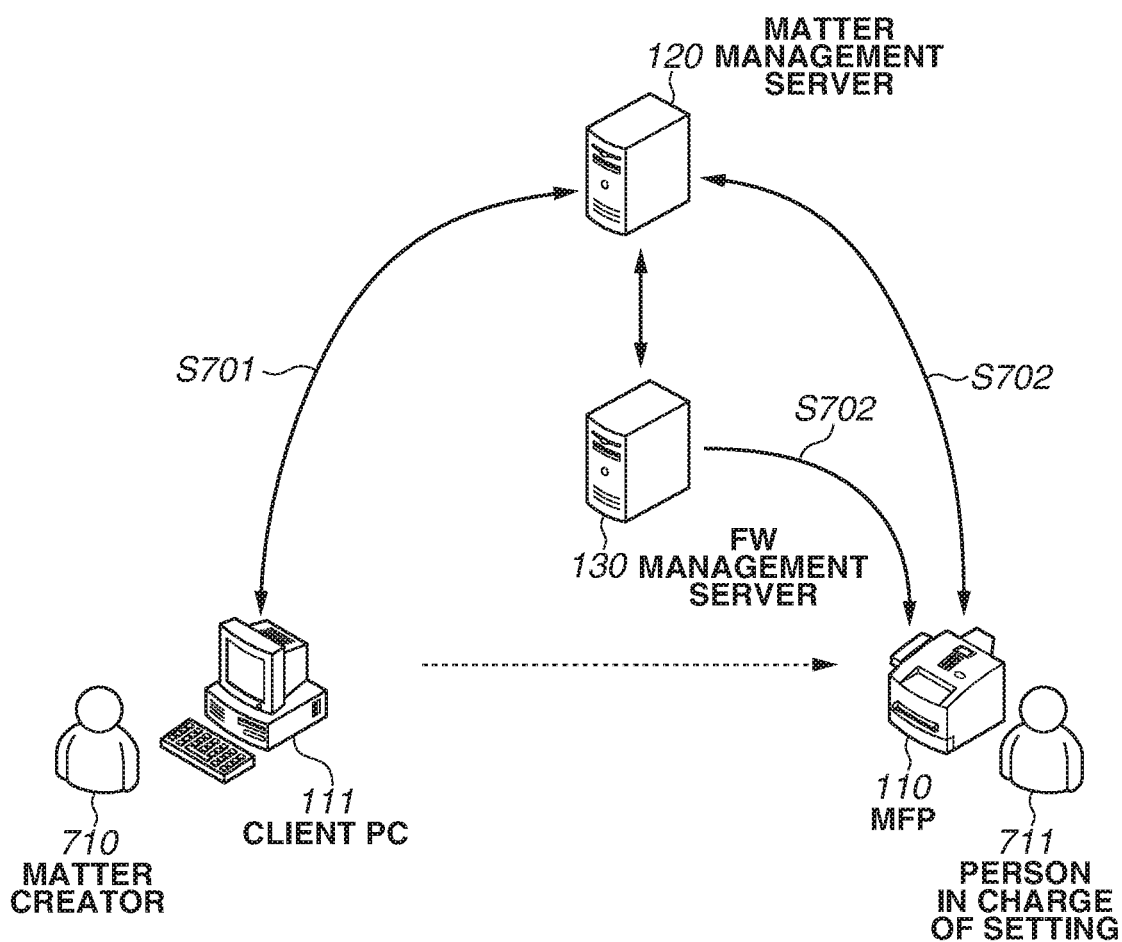
FIG. 7 is a diagram illustrating an example of an automatic setting operation for a multifunction peripheral (MFP).

FIG. 7 is a diagram used to explain an automatic setting operation of the MFP 110. In operation S701, a matter creator 710 creates a matter. Creation of a matter is not performed by a single person, but a sales representative sets the contents determined by the sales representative and a client interacting with each other or a setting administrator performs minor correction to the setting contents at a warehouse for managing entering and dispatching of MFPs. In the first exemplary embodiment, persons who edit a matter, such as a sales representative and a setting administrator, are collectively referred to as a "matter creator". The matter creator uses the matter creation program 320 in the client PC 111 and inputs data about, for example, a configuration of the MFP to UIs (illustrated in FIGS. 9A, 9B, and 9C described below) which the matter creation program 320 displays. While the configuration of the MFP includes, for example, a machine model, hardware options, and action configuration data, in the first exemplary embodiment, the matter creator is assumed to input only action configuration data. The input contents are transmitted as matter data from the client PC 111 to the matter management server 120 and are then stored in the data storage unit 374 of the matter management server 120. In operation S702, a person in charge of setting 711 performs an actual setting operation for setting the MFP 110. The person in charge of setting 711 connects the MFP 110 to the LAN 100. The person in charge of setting 711 selects buttons for performing setting at UIs (illustrated in FIGS. 11A and 11B described below) which the automatic setting program 300 in the MFP 110 displays. Upon detecting the setting buttons being selected, the automatic setting program 300 communicates with the matter management server 120 and the FW management server 130 and starts an automatic setting operation. Processing in the automatic setting operation is described below in detail with reference to FIG. 12.

<FW Management Data>

FIGS. 8A and 8B are diagrams illustrating examples of FW management data which is managed by the data storage unit 355 of the FW management server 130. Here, FW management data about the model "MFP-X" is assumed to be taken as an example. FIG. 8A illustrates FW management data obtained at the time of matter data creation (S701). At this point of time, the latest FW version is "10.0", and the action configuration schema version (action configuration schema package) is "1.0". FIG. 8B illustrates FW management data obtained at the time of MFP setting (S702). Time has passed since the creation of matter data, and new FW has been published several times. Therefore, the latest FW version has become "30.0", and the action configuration schema version has become "2.0".

<Matter Data Creation Flow>

Details of processing performed by the respective programs in an operation for creating a matter described with reference to FIG. 7 are described with reference to FIGS. 9A to 9C and FIG. 10. FIGS. 9A to 9C are diagrams illustrating UIs which the matter creation program 320 displays. The UI control unit 321 display a screen. These UIs are operated by the matter creator 710 in performing operation S701. FIG. 10 is a flowchart illustrating an example of information processing which is performed by the client PC 111 and the respective management servers. The example of information processing illustrated in FIG. 10 is an example of processing which is performed by the matter creation program 320 of the client PC 111, the FW management program 350 of the FW management server 130, and the matter management program 370 of the matter management server 120 in a matter data creation operation. Step S1001 to step S1007 are implemented by the CPU 251 of the client PC 111 executing the matter creation program 320. Step S1051 to step S1054 are implemented by the CPU 281 of the FW management server 130 executing the FW management program 350. Step S1081 to step S1084 are implemented by the CPU 281 of the matter management server 120 executing the matter management program 370. FIG. 9A illustrates an example of a UI for displaying a top screen of the matter creation program 320. A UI 900 is composed of a button 902 to a button 904. The button 902 is a button used to create new matter data. Upon detecting the button 902 being selected, the matter creation program 320 displays a UI 930 used to create matter data. In a case where the button 902 has been selected, since creation of new matter data is intended, the matter creation program 320 displays the respective controls, such as text boxes, in a blank state. The edit button 903 is a button used to edit matter data. Moreover, the button 904 is a button used to end the matter creation program 320. Step S1001 to step S1007 are matter data creation processing which is performed by the matter creation program 320 when the matter creator 710 has selected the button 902. Step S1051 to step S1054 are action configuration schema acquisition processing which is performed by the FW management program 350 during a period from when the FW management program 350 receives an action configuration schema acquisition request transmitted from the matter creation program 320 in processing performed in step S1001 to when the FW management program 350 returns a response. Step S1081 to step S1084 are matter data registration processing which is performed by the matter management program 370 during a period from when the matter management program 370 receives a matter registration request transmitted from the matter creation program 320 in processing performed in step S1005 to when the FW management program 350 returns a response.

In step S1001, the UI control unit 321 detects selection of a setting item acquisition button 934. When the UI control unit 321 has detected selection of the setting item acquisition button 934, the communication unit 324 transmits a request for acquisition of an action configuration schema of the latest FW to the FW management server 130. Then, the processing proceeds to step S1002. FIG. 9B illustrates an example of a UI which the UI control unit 321 of the matter creation program 320 displays to perform processing for creating new matter data when the button 902 has been selected in the UI illustrated in FIG. 9A. A number issued when matter data has been stored in the matter management server 120 is displayed in a matter number 931. At a point of time when the UI 930 has been displayed, since no matter data has been created and stored, no number is issued and, therefore, the matter number 931 is blank. A matter name 932 is the name of a new matter which is to be created. To make matter data easily recognizable, an optional character string is able to be set as the matter name A model 933 is able to be selected from a pulldown menu for selecting a model of the MFP. Since FW (FIG. 4) and an action configuration schema (FIGS. 5A and 5B) are defined for every model, the matter creator 710 selects which model is to be set, with use of the model 933. When transmitting a request for acquisition of an action configuration schema, the communication unit 324 transmits the request for acquisition together with the model data selected with the model 933. Moreover, at this point of time, since the setting item is not clear, none is displayed in a setting item 950. In the first exemplary embodiment, a model "MFP-X" is assumed to be selected. The request for acquisition of an action configuration schema can be transmitted from the client PC 111 not directly to the FW management server 130 but to the FW management server 130 via the matter management server 120.

In step S1051, the communication unit 354 monitors whether the request for acquisition of an action configuration schema has been received from the client PC 111. If it is determined that the request for acquisition has been received (YES in step S1051), the communication unit 354 advances the processing to step S1052, and, if it is determined that the request for acquisition has not been received (NO in step S1051), the communication unit 354 continues monitoring. In step S1052, the communication unit 354 receives model information "MFP-X" transmitted in step S1001. When the communication unit 354 has received the model information "MFP-X", the processing execution unit 351 requests the data management unit 353 to acquire the latest FW version. Then, the processing proceeds to step S1053. The data management unit 353 acquires the latest FW version of the model information "MFP-X" from the FW management data stored in the data storage unit 355. It can be seen from FIG. 8A that, at the time of matter data creation, the latest FW of the model information "MFP-X" is "10.0". In step S1053, the action configuration schema extraction unit 352 acquires an action configuration schema version and an action configuration schema which are included in the FW version acquired in step S1052. Then, the processing proceeds to step S1054. It can be seen from FIG. 8A that the action configuration schema version included in the FW version "10.0" is "1.0" (801). Additionally, it can be seen from FIGS. 5A and 5B that the action configuration schema version "1.0" is an action configuration schema 500. In step S1054, the communication unit 354 transmits the action configuration schema version "1.0" and data about the action configuration schema 500, which have been acquired in step S1053, to the client PC 111, and then ends the action configuration schema acquisition processing.

In step S1002, the communication unit 324 monitors whether a response has been received from the FW management server 130. If it is determined that a response has been received (YES in step S1002), the communication unit 324 advances the processing to step S1003, and, if it is determined that no response has been received (NO in step S1002), the communication unit 324 continues monitoring.

In step S1003, the communication unit 324 receives the action configuration schema version "1.0" and data about the action configuration schema 500, which have been transmitted from the FW management server 130 in step S1054. Then, the processing proceeds to step S1004. In step S1004, the UI control unit 321 displays, in the setting item 950, the action setting item 501 included in the action configuration schema data received in step S1003. Moreover, the processing execution unit 322 creates action configuration data. Then, the processing proceeds to step S1005.

In the first exemplary embodiment, the UI control unit 321 creates and displays setting items of a sleep transition time, a data erasure method, and a data compression rate. Moreover, the UI control unit 321 also displays buttons 951 to 953 for setting action setting values with respect to the respective action setting items. Moreover, a previous button 954 and a next button 955 are buttons which are displayed when there are action setting items other than the action setting items that are able to be displayed in the setting items, and are used to display such other action setting items. Moreover, a button 956 is a button used to save the edited matter data in the matter management server 120. Since, when a matter has been registered in the matter management server 120, a matter number for the column 601 is issued, the UI control unit 321 displays the issued matter number in the matter number 931. A cancel button 957 is a button used to display the UI 900 for matter data. The UI 900 is a top screen for matter data.

Additionally, FIG. 9C illustrates an example of a UI which the UI control unit 321 displays to allow an action setting value to be set to the selected action setting item when any one of the buttons 951 to 953 has been selected in the UI illustrated in FIG. 9B. Here, the button 951 for the action setting item "sleep transition time" is assumed to have been selected, and a UI which allows an action setting value for that item to be set is described. A matter number 961, a matter name 962, and a model 963 are similar to the matter number 931, the matter name 932, and the model 933 described with respect to the UI 930. The UI control unit 321 displays, at a setting item and action setting value 964, the initial value 502 and the specifications of input values 503 regarding the action setting item "sleep transition time" specified at the UI 930. Since the specifications of input values for "sleep transition time" specified in the action configuration schema 500 are "5 minutes/1 hour/6 hours/12 hours", the UI control unit 321 displays such items in a selectable form. Additionally, the UI control unit 321 displays the initial value 502 being "1 hour". Upon detecting that a setting button 965 has been selected, the UI control unit 321 saves a value specified at the setting item and action setting value 964. A button 966 is a button used to save the edited matter data in the matter management server 120. A cancel button 967 is a button used to display the UI 930 for creating new matter data. Operating UIs in the above-described way, the matter creator 710 issues an instruction to create action configuration data which is to be included in matter data. In the first exemplary embodiment, the processing execution unit 322 is assumed to have created action configuration data "setting_A111.data" illustrated in FIG. 5B based on an instruction for creation issued via UIs.

In step S1005, the UI control unit 321 detects that the button 956 or the button 966 has been selected. When the UI control unit 321 detects that the button 956 or the button 966 has been selected, the processing execution unit 322 creates matter data including the action configuration data created in step S1004. Then, the communication unit 324 transmits the created matter data and a matter data registration request to the matter management server 120. Then, the processing proceeds to step S1006. The matter data includes, in addition to the action configuration data "setting_A111.data", the matter name "name a111", the model "MFP-X" specified at the model 933, and the action configuration schema version "1.0" acquired in step S1003.

In step S1081, the communication unit 373 monitors whether a registration request for matter data has been received from the client PC 111. If it is determined that the registration request has been received (YES in step S1081), the communication unit 373 advances the processing to step S1082, and, if it is determined that the registration request has not been received (NO in step S1081), the communication unit 373 continues monitoring. In step S1082, the communication unit 373 receives the matter data transmitted in step S1005. Then, the processing proceeds to step S1083. In step S1083, the data management unit 372 issues a matter number with respect to the matter data received in step S1082, and saves the matter number and received matter data in the data storage unit 374. Then, the processing proceeds to step S1084. In the first exemplary embodiment, the data management unit 372 is assumed to issue the matter number "A111" and save the received matter data as matter data 606. The processing performed in step S1083 is an example of processing for storing an action configuration data file and an action configuration schema version while associating them with each other. In step S1084, the communication unit 373 transmits the matter number issued in step S1083 to the client PC 111, and then ends the matter data registration processing. Here, the communication unit 373 is assumed to transmit the matter number "A111".

In step S1006, the communication unit 324 monitors whether a response has been received from the matter management server 120. If it is determined that a response has been received (YES in step S1006), the communication unit 324 advances the processing proceeds to step S1007, and, if it is determined that no response has been received (NO in step S1006), the communication unit 324 continues monitoring. In step S1007, the communication unit 324 receives the issued matter number from the matter management server 120, and then ends the matter data creation processing. Here, the communication unit 324 is assumed to receive the matter number "A111".

<Automatic Setting Program UI>

FIGS. 11A and 11B are diagrams illustrating examples of UIs each of which is displayed on the operation unit 208 of the MFP 110. The person in charge of setting 711 operates the UIs illustrated in FIGS. 11A and 11B when performing operation S702. FIG. 11A is a diagram illustrating an example of a UI for a top screen of the MFP 110. The UI 1100 includes a button 1101. The button 1101 is a button used to invoke the automatic setting program 300. Upon detecting that the button 1101 has been selected, a UI program incorporated in the MFP 110 invokes the automatic setting program 300. While, in the first exemplary embodiment, only the button 1101 is displayed for ease of description, the first exemplary embodiment is not limited to this. FIG. 11B is a diagram illustrating an example of a UI for the automatic setting program 300. The UI illustrated in FIG. 11B is a UI which is displayed when the button 1101 has been selected. The UI 1150 includes a matter number 1154 and a button 1151 to a button 1153. The person in charge of setting 711 inputs, to the matter number 1154, a matter number which is to be set to the MFP 110, and then selects the button 1151. Upon detecting that the button 1151 has been selected, the automatic setting program 300 acquires, from the matter management server 120, the matter data 606 of the input matter number "A111", and displays the outline of the matter data 606. Upon detecting that the button 1152 has been selected, the automatic setting program 300 starts an automatic setting operation. Processing performed in the automatic setting operation is described below with reference to FIG. 12. The button 1153 is a button used to end the automatic setting program 300.

<Flow of MFP Automatic Setting>

Details of processing which is performed by the respective programs in the operations for setting the MFP described with reference to FIG. 7 are described with reference to FIG. 12 and FIGS. 13A and 13B. FIG. 12 is a flowchart illustrating an example of information processing which is performed by the MFP 110 and the respective management servers. The example illustrated in FIG. 12 is an example of processing which is performed by the automatic setting program 300 of the MFP 110, the FW management program 350 of the FW management server 130, and the matter management program 370 of the matter management server 120 in an MFP setting operation. Step S1201 to step S1208 are implemented by the CPU 201 executing the automatic setting program 300. Step S1251 to step S1254 and step S1281 to step S1282 are implemented by the CPU 281 of the FW management server 130 executing the FW management program 350. Step S1221 to step S1227 are implemented by the CPU 281 of the matter management server 120 performing the matter management program 370. FIGS. 13A and 13B are diagrams illustrating action setting values in the MFP 110 obtained before and after the action configuration data 520 is applied to the MFP 110, respectively. Step S1201 to step S1208 are automatic setting processing which is performed by the automatic setting program 300 when the person in charge of setting 711 has selected the button 1152. Step S1221 to step S1227 are matter data transmission processing which is performed by the matter management program 370 during a period from when the matter management program 370 receives the matter data acquisition request transmitted from the automatic setting program 300 in step S1201 to when the matter management program 370 returns a response. Step S1251 to S1254 are FW version transmission processing with the action configuration schema version specified which is performed by the FW management program 350 during a period from when the FW management program 350 receives the latest FW version acquisition request transmitted from the matter management program 370 in step S1224 to when the FW management program 350 returns a response. Step S1281 to step S1282 are FW transmission processing which is performed by the FW management program 350 during a period from when the FW management program 350 receives the FW acquisition request transmitted from the automatic setting program 300 in step S1205 to when the FW management program 350 returns a response.

In step S1201, the UI control unit 301 detects selection of the button 1152. When the UI control unit 301 has detected selection of the button 1152, the communication unit 303 transmits a matter data acquisition request to the matter management server 120. Then, the processing proceeds to step S1202. The communication unit 303 transmits the matter data acquisition request together with the number "A111" input to the matter number 1154.

In step S1221, the communication unit 373 monitors whether the matter data acquisition request has been received from the MFP 110. If it is determined that the matter data acquisition request has been received (YES in step S1221), the communication unit 373 advances the processing to step S1222, and, if it is determined that the matter data acquisition request has not been received (NO in step S1221), the communication unit 373 continues monitoring. In step S1222, the communication unit 373 receives the matter number "A111" transmitted in step S1201. When the communication unit 373 has received the matter number, the data management unit 372 acquires matter data 606 from the data storage unit 374. In step S1223, the processing execution unit 371 acquires an action configuration schema version "1.0" from the matter data acquired in step S1222. In step S1224, the communication unit 373 transmits, to the FW management server 130, an acquisition request for the latest FW version together with the action configuration schema version "1.0" acquired in step S1223. Then, the processing proceeds to step S1225.

In step S1251, the communication unit 354 monitors whether the latest FW acquisition request has been received from the matter management server 120. If it is determined that the latest FW acquisition request has been received (YES in step S1251), the communication unit 354 advances the processing to step S1252, and, if it is determined that the latest FW acquisition request has not been received (NO in step S1251), the communication unit 354 continues monitoring. In step S1252, the communication unit 354 acquires the action configuration schema version "1.0" from the matter management server 120. In step S1253, the data management unit 353 acquires, from the data storage unit 355, the latest FW version including the action configuration schema version "1.0" received in step S1252. At the time of MFP setting, FW management data for the model "MFP-X" is data such as that illustrated in FIG. 8B. Among the FW management data, the latest FW version including the action configuration schema version "1.0" is "20.0". Accordingly, the data management unit 353 acquires "20.0" as the latest FW version. In step S1254, the communication unit 354 transmits the latest FW version "20.0" acquired in step S1253 to the matter management server 120, and then ends the FW version transmission processing with the action configuration schema version specified.

In step S1225, the communication unit 373 monitors whether a response has been received from the FW management server 130. If it is determined that a response has been received (YES in step S1225), the communication unit 373 advances the processing to step S1226, and, if it is determined that no response has been received (NO in step S1225), the communication unit 373 continues monitoring. In step S1226, the communication unit 373 acquires the latest FW version from among pieces of FW including the action configuration schema version acquired from the FW management server 130 in step S1223. Here, processing which, for example, adds information about the acquired FW version to the matter data stored in the data storage unit 374 or changes such information is not performed. For example, since, if a bug has been found in any given FW, information about such FW is deleted from the FW management server 130, the matter data retaining such an FW version will pose an obstacle to the information processing system. Additionally, for example, in a case where the action configuration schema version at the time of matter data creation is "2.0", in step S1224, the communication unit 373 makes an inquiry about the latest FW version of the action configuration schema version "2.0". According to the FW management data at the time of MFP setting (FIG. 8B), the latest FW version of the action configuration schema version "2.0" is seen as "30.0". In step S1226, the communication unit 373 acquires "30.0". However, in a case where the action configuration schema version of an FW version "40.0" scheduled for use in future updating is also "2.0", the latest FW version is changed to "40.0", so that the communication unit 373 would acquire "40.0". Accordingly, since the latest FW version varies depending on the timing of MFP setting, a configuration in which changing of matter data is not performed and the communication unit 373 inquires of the FW management server 130 about the latest FW version each time in step S1224.

In step S1227, the communication unit 373 transmits, to the MFP 110, the matter data 606 acquired in step S1222 and the latest FW version "20.0" acquired in step S1226, and then ends the matter data transmission processing.

In step S1202, the communication unit 303 monitors whether a response has been received from the matter management server 120. If it is determined that a response has been received (YES in step S1202), the communication unit 303 advances the processing to step S1203, and, if it is determined that no response has been received (NO in step S1202), the communication unit 303 continues monitoring. In step S1203, the communication unit 303 receives the matter data 606 and the latest FW version "20.0" from the matter management server 120. In step S1204, the FW update unit 304 determines whether updating of the latest FW version "20.0" received in step S1203 is needed. For example, if the FW configuration of the MFP 110 targeted for setting is the version "20.0", the FW update unit 304 determines that, since the versions are the same, updating is not needed (NO in step S1204), and then advances the processing to step S1208. However, if the FW configuration of the MFP 110 targeted for setting is other than the version "20.0", the FW update unit 304 determines that updating is needed (YES in step S1204), and then advances the processing to step S1205. In step S1205, the FW update unit 304 transmits an FW acquisition request for the FW version "20.0" to the FW management server 130.

In step S1281, the communication unit 354 monitors whether the FW acquisition request has been received from the MFP 110. If it is determined that the FW acquisition request has been received (YES in step S1281), the communication unit 354 advances the processing to step S1282, and, if it is determined that the FW acquisition request has not been received (NO in step S1281), the communication unit 354 continues monitoring. In step S1282, the data management unit 353 acquires FW of the FW version "2.0" from the data storage unit 355. The communication unit 354 transmits, to the MFP 110, the FW acquired from the data storage unit 355, and then ends the FW transmission processing.

In step S1206, the communication unit 303 monitors whether a response has been received from the FW management server 130. If it is determined that a response has been received (YES in step S1206), the communication unit 303 advances the processing to step S1207, and, if it is determined that no response has been received (NO in step S1206), the communication unit 303 continues monitoring. In step S1207, the communication unit 303 receives the FW of the FW version "2.0" from the FW management server 130. The FW update unit 304 updates the FW to "2.0" Immediately after FW updating, with respect to the action setting values of the MFP 110, the initial values defined in the action configuration schema 500 are set as the action setting values 1300 illustrated in FIG. 13A. In step S1208, the action configuration data setting unit 305 applies the action configuration data "setting_A111.data" 520, which is included in the matter data 606 received in step S1203, and then ends the automatic setting processing. Here, applying "setting_A111.data" causes the action setting values of the MFP 110 to be changed to values indicated by the action setting values 1310 illustrated in FIG. 13B, which are equal to values of "setting_A111.data".

As described above, according to the information processing system in the first exemplary embodiment, in a case where, when the latest FW is searched for, there is action configuration data scheduled for setting after updating, an action configuration schema version is previously recorded when the action configuration data was created. Then, the latest FW version is searched for from among pieces of FW including the action configuration schema version previously stored in the information processing system. Accordingly, it is possible to search for the latest FW version according to which action configuration data is correctly set, at the time of setting of the MFP 110 and install the found latest FW version on the MFP 110. Additionally, it is possible to correctly set action setting values defined by the action configuration data to the MFP 110. Therefore, it is possible to set a newer FW version whenever possible.

In the above-described first exemplary embodiment, an information processing system which determines the latest FW based on the specified action configuration schema version has been described in detail as a method of correctly setting, at the time of MFP setting (S702), action configuration data created at the time of matter data creation (S701) to the MFP 110. In a second exemplary embodiment, processing for determining whether an FW version which is correctly set is able to be changed to the more latest version, by comparing pieces of action configuration data created at the time of matter data creation while an action configuration schema version is specified, is described. FIG. 14 is a diagram illustrating examples of FW management data in the second exemplary embodiment as with FIGS. 8A and 8B. FIGS. 15A and 15B are diagrams illustrating examples of action configuration schemata and action configuration data in the second exemplary embodiment as with FIGS. 5A and 5B. FIGS. 16A and 16B are flowcharts illustrating an example of information processing which is performed by the matter management server 120 and the FW management server 130 in the second exemplary embodiment. The example illustrated in FIGS. 16A and 16B corresponds to a flowchart in which a part of the processing illustrated in FIG. 12 is modified in conformity with the second exemplary embodiment. Thus, processing for determining the latest FW version (step S1224 to step S1226 and step S1251 to step S1254), which is performed by the FW management program 350 of the FW management server 130 and the matter management program 370 of the matter management server 120, is modified.

Step S1621, step S1622 to step S1624, and step S1671 to step S1673 are implemented by the CPU 281 of the FW management server 130 executing the FW management program 350. Step S1601 to step S1608 and step S1651 to step S1653 are implemented by the CPU 281 of the matter management server 120 executing the matter management program 370.

FW management data 1400 and FW management data 1410 are pieces of FW management data which are managed by the FW management server 130. The FW management data 1400 is data obtained at the time of matter data creation (S701). The FW management data 1410 is data obtained at the time of MFP setting (S702).

FIG. 15A is a diagram illustrating action configuration schemata. An action configuration schema 1500, an action configuration schema 1510, and an action configuration schema 1520 are action configuration schemata of the version "1.0", the version "2.0" and the version "3.0", respectively. FIG. 15B is a diagram illustrating examples of pieces of action configuration data created by the matter creation program 320. Both pieces of action configuration data are assumed to be created with the action configuration schema version "1.0" used as a reference. Moreover, when creating action configuration data with use of the matter creation program (FIGS. 9A to 9C), the matter creator 710 is able to select the buttons 951 to 953 in the UI 930 and thus set an action setting value with respect to each action setting item. Then, only an action setting item in which a value is set here is included in the action configuration data. For example, in the case of action configuration data 1550, an action setting value for the "job storage period" is specified, and an action setting value for the other action setting item ("data erasure method") is not specified (an initial value is set). In the second exemplary embodiment, processing for searching for the latest FW in a case where, at the time of matter data creation (S701), the matter creator 710 creates matter data including the action configuration data 1550 and action configuration data 1560 and registers the created matter data in the matter management server 120 is described. First, processing for transmission and reception of the latest FW version ad an action configuration schema, which is performed by the matter management server 120 and the FW management server 130, in a case where an action configuration schema version is specified is described.

The following is latest FW acquisition processing with the action configuration schema version specified, which is included in the matter management program 370. In step S1651, the communication unit 373 transmits an action configuration schema version to the FW management server 130 and thus transmits a request for acquisition of the latest FW version and an action configuration schema. In step S1652, the communication unit 373 monitors whether a response has been received from the FW management server 130. If it is determined that a response has been received (YES in step S1652), the communication unit 373 advances the processing to step S1653, and, if it is determined that no response has been received (NO in step S1652), the communication unit 373 continues monitoring. In step S1653, the communication unit 373 receives the latest FW version and the action configuration schema from the FW management server 130, and then ends the latest FW acquisition processing with the action configuration schema version specified.

The following is latest FW version and action configuration schema transmission processing with the action configuration schema version specified, which is included in the FW management program 350. In step S1671, the communication unit 354 monitors whether a request for acquisition of the latest FW version and the action configuration schema has been received from the matter management server 120. If it is determined that the request for acquisition has been received (YES in step S1671), the communication unit 354 advances the processing to step S1672, and, if it is determined that the request for acquisition has not been received (NO in step S1671), the communication unit 354 continues monitoring. In step S1672, the communication unit 354 and the data management unit 353 perform processing similar to processing in step S1252 and step S1253. Additionally, the action configuration schema extraction unit 352 acquires an action configuration schema included in the acquired latest FW version. For example, in a case where the specified action configuration schema version is "1.0", the action configuration schema extraction unit 352 finds, from the FW management data 1410 obtained at the time of MFP setting, that the latest FW version out of pieces of FW including the action configuration schema version "1.0" is "20.0".

Accordingly, the action configuration schema extraction unit 352 acquires the latest FW version "20.0" and the action configuration schema 1500 of the action configuration schema version "1.0". Moreover, for example, in a case where the specified action configuration schema version is "2.0", the action configuration schema extraction unit 352 finds, from the FW management data 1410 obtained at the time of MFP setting, that the latest FW version out of pieces of FW including the action configuration schema version "2.0" is "40.0". Accordingly, the action configuration schema extraction unit 352 acquires the latest FW version "40.0" and the action configuration schema 1510 of the action configuration schema version "2.0". In step S1673, the communication unit 354 transmits the latest FW version and the action configuration schema acquired in step S1672 to the matter management server 120, and then ends the latest FW version and action configuration schema transmission processing with the action configuration schema version specified.

Next, processing for determining the latest FW, which is able to correctly set action setting values, from action configuration data which is used is described. In step S1601, the processing execution unit 371 performs latest FW acquisition request processing with the action configuration schema version specified. Processing in step S1601 corresponds to processing in step S1651 to step S1653. Here, the processing execution unit 371 specifies the action configuration schema version acquired in step S1223. Action configuration data included in the matter data in the second exemplary embodiment is data such as that illustrated in FIG. 15B, and has been created with the action configuration schema version "1.0" used as a reference, as mentioned above. Accordingly, here, the action configuration schema version "1.0" is specified. Accordingly, the processing execution unit 371 acquires the FW version "20.0" and the action configuration schema 1500 from the FW management server 130.

In step S1621, the processing execution unit 351 performs processing for transmission of the latest FW version and the action configuration schema with the action configuration schema version specified, and then ends the latest FW version and action configuration schema transmission processing. Processing in step S1621 corresponds to processing in step S1671 to step S1673.

In step S1602, the communication unit 373 transmits a request for acquisition of the latest action configuration schema version to the FW management server 130.

In step S1622, the communication unit 354 monitors whether a request for acquisition of the latest action configuration schema version has been received from the matter management server 120. If it is determined that the request for acquisition has been received (YES in step S1622), the communication unit 354 advances the processing to step S1623, and, if it is determined that the request for acquisition has not been received (NO in step S1622), the communication unit 354 continues monitoring. In step S1623, the data management unit 353 acquires the latest FW from the FW management data stored in the data storage unit 355, and thus acquires an action configuration schema version included in the acquired latest FW. The data management unit 353 finds, from the FW management data 1410 obtained at the time of MFP setting, that the latest FW version is "50.0" and, furthermore, that the action configuration schema version is "3.0". In step S1624, the communication unit 354 transmits the action configuration schema version acquired in step S1623 to the matter management server 120, and then ends the latest information acquisition request processing.

In step S1603, the communication unit 373 monitors whether a response has been received from the FW management server 130. If it is determined that a response has been received (YES in step S1603), the communication unit 373 advances the processing to step S1604, and, if it is determined that no response has been received (NO in step S1603), the communication unit 373 continues monitoring. In step S1604, the communication unit 373 acquires the action configuration schema version from the FW management server 130. Here, the communication unit 373 acquires the action configuration schema version "3.0". In step S1605, the processing execution unit 371 performs the latest FW acquisition request processing with the action configuration schema version specified. Here, first, the processing execution unit 371 specifies the action configuration schema version "3.0" acquired in step S1604. The processing execution unit 371 finds, from the FW management table 1410 obtained at the time of MFP setting, that the latest FW version out of pieces of FW including the action configuration schema version "3.0" is "50.0". Accordingly, the matter management server 120 acquires the FW version "50.0" and the action configuration schema 1520 from the FW management server 130. While, in this processing, the FW management server 130 also performs the latest FW version and action configuration schema acquisition processing with the action configuration schema version specified, such processing is equivalent to processing in step S1601 and step S1621 and is, therefore, omitted from illustration. In step S1606, the processing execution unit 371 extracts an action setting item in which there is a difference in initial value or specifications of input values or in both between the action configuration schema 1500 acquired in step S1601 and the action configuration schema 1520 acquired in step S1605. The difference between the action configuration schema 1500 and the action configuration schema 1520 resides in "job storage period" and "data erasure method". Moreover, for example, if, in step S1605, the action configuration schema 1510 is assumed to be acquired, the processing execution unit 371 extracts a difference between the action configuration schema 1500 and the action configuration schema 1510, so that the extracted action setting item becomes only "data erasure method". In step S1607, the processing execution unit 371 determines whether an action setting item of action configuration data included in the matter data acquired in step S1222 is included in the action setting item extracted in step S1606. If it is determined that the action setting item is included in the extracted action setting item (YES in step S1607), the processing execution unit 371 advances the processing to step S1608, and, if it is determined that the action setting item is not included in the extracted action setting item (NO in step S1607), the processing execution unit 371 determines that the FW version received in step S1605 is the latest FW version, and then ends the latest FW determination processing.

For example, suppose that the processing execution unit 371 acquires the action configuration schema 1500 in step S1601 and acquires the action configuration schema 1510 in step S1605. First, in a case where an action configuration data included in the matter data acquired by the communication unit 373 in step S1222 is the action configuration data 1550, a difference between the action configuration schema 1500 and the action configuration schema 1510 is the action setting item "data erasure method". Then, the action setting item included in the action configuration data 1550 is "job storage period". Accordingly, the processing execution unit 371 determines that the action setting item included in the action configuration data 1550 is not included in the difference (NO in step S1607). Next, in a case where an action configuration data included in the matter data acquired by the communication unit 373 in step S1222 is the action configuration data 1560, a difference between the action configuration schema 1500 and the action configuration schema 1510 is the action setting item "data erasure method". Then, the action setting item included in the action configuration data 1560 is "data erasure method". Accordingly, the processing execution unit 371 determines that the action setting item included in the action configuration data 1560 is included in the difference (YES in step S1607). In a case where the action setting item included in the action configuration data 1560 is included in the difference (YES in step S1607), it can be determined that the action configuration data included in the matter data acquired in step S1222 is not a correct value for the action configuration schema acquired in step S1605. Therefore, the matter management server 120 degrades the action configuration schema version, and searches for a version thereof in which a correct value is able to be set. In step S1608, the processing execution unit 371 sets an action configuration schema version which is one step lower than the action configuration schema version specified in step S1605. Then, the processing proceeds to step S1605. For example, in a case where the action configuration schema version specified in step S1605 is "3.0", the processing execution unit 371 sets the action configuration schema version to "2.0".

As described above, according to the information processing system in the second exemplary embodiment, in searching for the latest FW, a difference between latest action configuration schemata obtained at the time of matter data creation and at the time of MFP setting is compared with action configuration data, and, thus, the latest FW version is searched for. Accordingly, the more latest FW version also becomes a target for searching than in the first exemplary embodiment, and, depending on the situation, updating is able to be performed with the more latest FW version than in the first exemplary embodiment.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While several exemplary embodiments have been described above, the present disclosure is not limited to such specific exemplary embodiments.

As described above, according to the above-described exemplary embodiments, it is possible to set the newer FW version wherever possible. Moreover, it is possible to change the version of firmware more easily.

According to exemplary embodiments of the present disclosure, it is possible to change the version of firmware more easily.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-237318, filed Dec. 19, 2018, which is hereby incorporated by reference herein in its entirety.

What is claimed is:

1. An information processing system including a device and a client terminal which is able to create action configuration data for implementing a plurality of functions in the device, the information processing system comprising:
   a first management unit configured to manage a first version of firmware for implementing a plurality of functions in the device and a second version of a schema usable in the firmware of the first version;
   a second management unit configured to manage the action configuration data, which has been created based on information managed by the first management unit, and the second version; and
   a transmission unit configured to, in response to a request from the device, specify the action configuration data managed by the second management unit and to transmit the specified action configuration data and the first version to the device,
   wherein, in a case where an action setting item of the action configuration data is not included in an action setting item which is a difference between the second version schema and a version of the latest schema, the transmission unit specifies the first version, as a version of the latest firmware based on the second version schema and information managed by the first management unit, and transmits the action configuration data and the specified first version to the device.

2. The information processing system according to claim 1, further comprising a creation unit configured to specify the second version based on information managed by the first management unit and to create the action configuration data with use of a schema of the specified second version,
   wherein the second management unit manages the action configuration data created by the creation unit and the second version, and
   wherein the transmission unit specifies the first version based on the second version managed by the second management unit and information managed by the first management unit, and transmits the created action configuration data and the specified first version to the device.

3. The information processing system according to claim 2, wherein the transmission unit specifies, as the first version, a version of the latest firmware related to the second version based on the second version managed by the second management unit and information managed by the first management unit, and transmits the created action configuration data and the specified first version to the device.

4. The information processing system according to claim 1, wherein, in a case where an action setting item of the action configuration data is included in an action setting item which is a difference between the second version and a version of the latest schema, the transmission unit degrades the version of the latest schema one step, and determines whether an action setting item of the action configuration data is included in an action setting item which is a difference between the second version and the degraded version of the latest schema.

5. The information processing system according to claim 1, wherein the device is an image forming apparatus.

6. A control method for an information processing system including a device and a client terminal which is able to create action configuration data for implementing a plurality of functions in the device, the control method comprising:
   managing a first version of firmware for implementing a plurality of functions in the device and a second version of a schema usable in the firmware of the first version;
   managing the action configuration data, which has been created based on information about the first version and the second version, and the second version; and
   specifying, in response to a request from the device, the managed action configuration data, and transmitting the specified action configuration data and the first version to the device,
   wherein, in a case where an action setting item of the action configuration data is not included in an action setting item which is a difference between the second version schema and a version of the latest schema, the first version is specified, as a version of the latest firmware based on the second version schema and information about the first version and the second version, and the action configuration data and the specified first version are transmitted to the device.

* * * * *